(12) United States Patent
Hewitt et al.

(10) Patent No.: US 10,929,447 B2
(45) Date of Patent: Feb. 23, 2021

(54) SYSTEMS AND METHODS FOR CUSTOMIZED DATA PARSING AND PARAPHRASING

(71) Applicant: International Business Machines Corporation, Armonk, NY (US)

(72) Inventors: Trudy L. Hewitt, Cary, NC (US); Zachary Satira, Portland, OR (US); Nathan Stewart, Hillsborough, NC (US); Wilson Velez, Raleigh, NC (US); Heidi D. Williams, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 16/193,659

(22) Filed: Nov. 16, 2018

(65) Prior Publication Data

US 2019/0087488 A1 Mar. 21, 2019

Related U.S. Application Data

(63) Continuation of application No. 14/829,782, filed on Aug. 19, 2015, now Pat. No. 10,191,970.

(51) Int. Cl.
*G06F 16/00* (2019.01)
*G06F 16/33* (2019.01)
(Continued)

(52) U.S. Cl.
CPC ........ *G06F 16/3344* (2019.01); *G06F 16/335* (2019.01); *G06F 16/338* (2019.01);
(Continued)

(58) Field of Classification Search
CPC .... G06F 16/3323; G06F 16/24; G06F 16/285; G06F 16/435
See application file for complete search history.

(56) References Cited

U.S. PATENT DOCUMENTS 5,386,556 A 1/1995 Hedin et al.
7,027,975 B1 * 4/2006 Pazandak ............ G06F 16/3344
704/9

(Continued)

FOREIGN PATENT DOCUMENTS

| EP | 2316065 | 5/2011 |
|---|---|---|
| WO | 2002008950 | 1/2002 |
| WO | 2013066497 | 5/2013 |

OTHER PUBLICATIONS

Sieg et al., "Ontological User Profiles for Representing Context in Web Search," 2007 IEEE/WIC/ACM International Conferences on Web Intelligence and IntelligentAgent Technology, pp. 91-94 (Year 2007).

(Continued)

*Primary Examiner* — Alexandria Y Bromell
(74) *Attorney, Agent, or Firm* — VanLeeuwen & VanLeeuwen; Alexander G. Jochym

(57) ABSTRACT

An approach is provided in which an information handling system parses content received from resources based on a user query corresponding to a user. Next, the information handling system selects a set of prioritized content from the parsed content based on a confidence ranking the plurality of parsed content. The information handling system then filters the set of prioritized content based on a learning style of the user and presents a summarized output of the filtered set of prioritized content to the user.

17 Claims, 6 Drawing Sheets

(51) Int. Cl.
  *G06N 20/00* (2019.01)
  *G06F 16/338* (2019.01)
  *G06F 16/335* (2019.01)
  *G06F 16/34* (2019.01)
  *G06F 16/35* (2019.01)

(52) U.S. Cl.
  CPC .......... *G06F 16/345* (2019.01); *G06F 16/355* (2019.01); *G06N 20/00* (2019.01)

(56) References Cited

U.S. PATENT DOCUMENTS

| | | | | |
|---|---|---|---|---|
| 8,005,826 B1* | 8/2011 | Sahami | ............... | G06F 16/438 707/723 |
| 8,438,472 B2 | 5/2013 | Mansfield et al. | | |
| 8,484,192 B1* | 7/2013 | Sahami | ............... | G06F 16/9535 707/708 |
| 8,639,650 B1* | 1/2014 | Gill | ............... | G06F 16/285 706/61 |
| 8,903,755 B2* | 12/2014 | Berlandier | ............... | G06N 5/025 706/47 |
| 8,954,342 B2* | 2/2015 | Bhandari | ............... | G06F 8/10 705/7.29 |
| 9,666,098 B2* | 5/2017 | Nielson | ............... | G06F 40/205 |
| 9,830,328 B2* | 11/2017 | Faith | ............... | G06F 16/164 |
| 9,911,001 B2* | 3/2018 | Bisaga | ............... | G06F 21/62 |
| 9,916,538 B2* | 3/2018 | Zadeh | ............... | G06K 9/627 |
| 2002/0083179 A1* | 6/2002 | Shaw | ............... | G06F 16/9574 709/227 |
| 2003/0131063 A1* | 7/2003 | Breck | ............... | H04L 51/12 709/206 |
| 2003/0216929 A1* | 11/2003 | Brockway | ............... | G06F 16/9535 705/326 |
| 2003/0217052 A1* | 11/2003 | Rubenczyk | ............... | G06F 16/951 |
| 2006/0200432 A1* | 9/2006 | Flinn | ............... | G06Q 30/0185 706/12 |
| 2006/0200433 A1* | 9/2006 | Flinn | ............... | G06N 20/00 706/12 |
| 2006/0200434 A1* | 9/2006 | Flinn | ............... | G06N 20/00 706/12 |
| 2006/0200435 A1* | 9/2006 | Flinn | ............... | G06N 20/00 706/12 |
| 2006/0259360 A1* | 11/2006 | Flinn | ............... | G06Q 30/0241 705/14.71 |
| 2007/0016563 A1* | 1/2007 | Omoigui | ............... | G06F 16/90 |
| 2007/0055564 A1* | 3/2007 | Fourman | ............... | G06Q 10/06393 705/7.39 |
| 2007/0203872 A1* | 8/2007 | Flinn | ............... | G06N 7/02 706/62 |
| 2008/0249967 A1* | 10/2008 | Flinn | ............... | G06N 20/00 706/11 |
| 2008/0249968 A1* | 10/2008 | Flinn | ............... | G06N 3/004 706/14 |
| 2009/0043824 A1 | 2/2009 | Claghorn | | |
| 2009/0058860 A1* | 3/2009 | Fong | ............... | G06F 40/20 345/467 |
| 2009/0119587 A1* | 5/2009 | Allen | ............... | G09B 5/00 715/705 |
| 2010/0070448 A1* | 3/2010 | Omoigui | ............... | H01L 27/14647 706/47 |
| 2010/0180029 A1* | 7/2010 | Fourman | ............... | G16H 10/60 709/225 |
| 2010/0257028 A1* | 10/2010 | Hillerbrand | ............... | G06Q 50/01 705/319 |
| 2010/0299334 A1* | 11/2010 | Waite | ............... | G06Q 10/10 707/755 |
| 2011/0035390 A1* | 2/2011 | Whitehouse | ............... | H04L 63/1425 707/755 |
| 2011/0059423 A1* | 3/2011 | Kadar | ............... | G09B 7/02 434/185 |
| 2011/0173225 A1* | 7/2011 | Stahl | ............... | G06Q 50/20 707/769 |
| 2011/0208822 A1* | 8/2011 | Rathod | ............... | G06F 16/9535 709/206 |
| 2011/0301941 A1* | 12/2011 | De Vocht | ............... | G06F 40/216 704/9 |
| 2012/0156667 A1* | 6/2012 | Singer | ............... | G09B 5/00 434/350 |
| 2012/0195261 A1 | 8/2012 | Nishida | | |
| 2012/0196261 A1* | 8/2012 | Kim | ............... | G09B 7/02 434/322 |
| 2012/0254074 A1* | 10/2012 | Flinn | ............... | G06F 16/951 706/4 |
| 2012/0254099 A1* | 10/2012 | Flinn | ............... | G06F 40/20 706/52 |
| 2012/0290518 A1* | 11/2012 | Flinn | ............... | G06F 16/24575 706/12 |
| 2013/0066921 A1* | 3/2013 | Mark | ............... | G06F 16/367 707/794 |
| 2013/0086079 A1* | 4/2013 | Chaudhuri | ............... | G06Q 50/01 707/748 |
| 2013/0108994 A1* | 5/2013 | Srinivasa | ............... | G09B 21/009 434/156 |
| 2013/0185074 A1 | 7/2013 | Gruber et al. | | |
| 2013/0204886 A1* | 8/2013 | Faith | ............... | G06Q 30/06 707/756 |
| 2013/0290233 A1* | 10/2013 | Ferren | ............... | G06F 3/041 706/46 |
| 2013/0290234 A1* | 10/2013 | Harris | ............... | G06N 5/022 706/46 |
| 2013/0317966 A1* | 11/2013 | Bass | ............... | H04W 4/025 705/37 |
| 2013/0330008 A1* | 12/2013 | Zadeh | ............... | G06K 9/6267 382/195 |
| 2014/0058812 A1* | 2/2014 | Bender | ............... | G06Q 30/0209 705/14.12 |
| 2014/0074629 A1* | 3/2014 | Rathod | ............... | G06Q 30/0277 705/14.73 |
| 2014/0079297 A1* | 3/2014 | Tadayon | ............... | G06K 9/00288 382/118 |
| 2014/0108156 A1* | 4/2014 | Hillerbrand | ............... | G06Q 50/01 705/14.66 |
| 2014/0143252 A1* | 5/2014 | Silverstein | ............... | G06F 16/80 707/737 |
| 2014/0176603 A1* | 6/2014 | Kumar | ............... | G06F 3/011 345/633 |
| 2014/0201126 A1* | 7/2014 | Zadeh | ............... | A61B 5/165 706/52 |
| 2014/0310595 A1* | 10/2014 | Acharya | ............... | G06T 11/00 715/706 |
| 2014/0317610 A1* | 10/2014 | Belfoure | ............... | G06F 16/93 717/168 |
| 2014/0358825 A1* | 12/2014 | Phillipps | ............... | G06Q 30/0241 706/11 |
| 2014/0358828 A1* | 12/2014 | Phillipps | ............... | G06N 20/00 706/12 |
| 2015/0095278 A1* | 4/2015 | Flinn | ............... | G06F 40/30 706/52 |
| 2015/0149455 A1* | 5/2015 | Whitley, Jr. | ............... | G06F 16/26 707/734 |
| 2015/0199229 A1* | 7/2015 | Amendjian | ............... | G06F 3/0481 714/57 |
| 2015/0254252 A1* | 9/2015 | Khalil | ............... | G06N 20/00 706/12 |
| 2015/0302763 A1* | 10/2015 | Gleim | ............... | G09B 7/04 434/237 |
| 2015/0317610 A1 | 11/2015 | Rao | | |
| 2015/0339573 A1* | 11/2015 | Flinn | ............... | G06F 40/30 706/52 |
| 2015/0363795 A1* | 12/2015 | Levy | ............... | G06Q 30/0201 705/7.29 |
| 2016/0042661 A1* | 2/2016 | Minkoff | ............... | G09B 7/00 434/157 |
| 2016/0063871 A1* | 3/2016 | Tseng | ............... | G09B 5/00 705/326 |
| 2016/0063881 A1* | 3/2016 | Brinton | ............... | G09B 7/00 434/353 |

(56) References Cited

U.S. PATENT DOCUMENTS

| | | | |
|---|---|---|---|
| 2016/0110316 A1* | 4/2016 | Carter | G06K 9/00442 |
| | | | 715/273 |
| 2016/0112531 A1* | 4/2016 | Milton | G06F 9/5083 |
| | | | 709/205 |
| 2016/0127010 A1* | 5/2016 | Rho | G09B 5/065 |
| | | | 375/257 |
| 2016/0132789 A1* | 5/2016 | Flinn | G06N 5/048 |
| | | | 706/14 |
| 2016/0180248 A1* | 6/2016 | Regan | G09B 5/00 |
| | | | 706/12 |
| 2016/0188725 A1* | 6/2016 | Wang | G06F 16/9535 |
| | | | 707/734 |
| 2016/0193500 A1* | 7/2016 | Webster | G09B 19/0038 |
| | | | 434/247 |
| 2016/0364444 A1* | 12/2016 | Bisaga | G06F 21/6227 |
| 2017/0032298 A1* | 2/2017 | de Ghellinck | G06Q 10/0639 |
| 2017/0041388 A1* | 2/2017 | Tal | G06Q 10/10 |
| 2017/0053021 A1 | 2/2017 | Hewitt et al. | |
| 2017/0235786 A9* | 8/2017 | Faith | G06F 16/9024 |
| | | | 707/607 |
| 2017/0256179 A1* | 9/2017 | Nielson | G09B 5/00 |
| 2018/0046623 A1* | 2/2018 | Faith | G06Q 30/06 |

OTHER PUBLICATIONS

Sontag et al., "Probabilistic Models for PersonalizingWeb Search," WSDM '12, pp. 433-442. (Year 2012).

Kupiec et al., "A Trainable Document Summarizer," Proceedings of the 18th annual International ACM SIGIR conference on Research and Development in Information Retrieval, New York, NY, 1995, 6 pages.

Mani et al., "Machine Learning of Generic and User-Focused Summarization," American Association for Artificial Intelligence, Nov. 2, 1998, 6 pages.

Leavenworth, "Program Development by Query," ip.com. IPCOMM000148802D, Mar. 30, 2007, 29 pages.

Whitney, "Semantic Transformations for Natural Language Production," ip.com, IPCOMM000151986D, 91 pages.

"List of IBM Patents or Patent Applications Treated as Related," Letter from Leslie A. Van Leeuwen, Nov. 16, 2018, 1 page.

* cited by examiner

SYSTEMS AND METHODS FOR CUSTOMIZED DATA PARSING AND PARAPHRASING

BACKGROUND

The present disclosure relates to parsing and paraphrasing single or multiple resources, and more specifically, generating user customized output to user queries from data gathered from one or more resources.

A user desiring information relating to query typically submits the query to a search engine or database and expects to receive information related to the submitted query. Typically, the user is expected to manually sort through a potentially vast amount of information from potentially thousands of different repositories of that information. Although some existing search engines attempt to "rank" the information for the user based on its relevance to the user query, the user is expected to manually sort through the information to determine which information is best suited for that particular user. Such a task can be time-consuming and can prevent the user from identifying the best information for that particular user. For at least these reasons, it is desired to provide improved techniques and systems for generating improved search results gathered from one or more resources.

SUMMARY

According to various embodiments of the present invention, methods and apparatus are provided, including computer program products, implementing and using techniques for customized data parsing and paraphrasing. An approach is disclosed that parses content received from resources based on a user query corresponding to a user. Next, the approach selects a set of prioritized content from the parsed content based on a confidence ranking the plurality of parsed content. The approach then filters the set of prioritized content based on a learning style of the user and presents a summarized output of the filtered set of prioritized content to the user.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
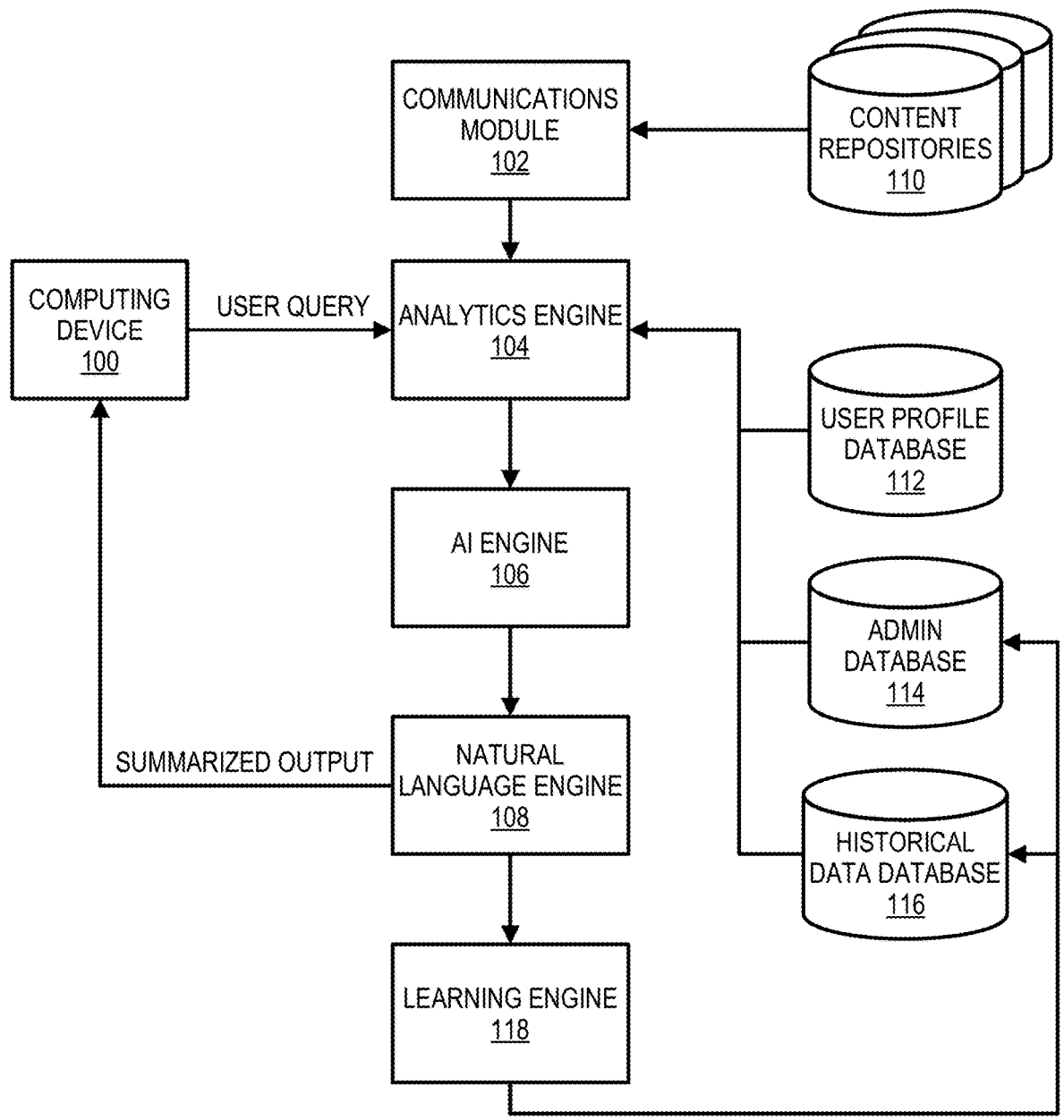
FIG. 1 is a diagram of an example system for presenting a summarized output of data gathered from one or more resources in response to a user query in accordance with embodiments of the present disclosure.

FIG. 1 illustrates a diagram of an example system for presenting a summarized output of data gathered from one or more resources in response to a user query in accordance with embodiments of the present disclosure. Referring to FIG. 1, the system shown in FIG. 1 may be configured to present a summarized output of data gathered from one or more resources to a computing device 100 in response to a user query from computing device 100. In accordance with embodiments, the user query may include a request for content. The content may include a request for text-based content, multimedia content, audio content, or any other suitable type of content consumable by a user of the computing device 100.

FIG. 1 also illustrates the system may be configured to present a summarized output of data gather from one or more resources by using a communications module 102, an analytics engine 104, an artificial intelligence (AI) engine 106, and a natural language engine 108. Each of the communications module 102, analytics engine 104, AI engine 106, and the natural language engine 108 may be implemented in hardware, firmware, software, or combinations thereof in accordance with embodiments of the present disclosure. For example, the communications module 102, analytics engine 104, AI engine 106, and the natural language engine 108, each may include one or more processors and memory to implement the functionalities described herein in accordance with the embodiments of the present disclosure. The system of FIG. 1 may, for example, include a server including one or more processors and memory configured to carry out the embodiments of the present disclosure using the communications module 102, analytics engine 104, AI engine 106, and the natural language engine 108.

Figure 2:
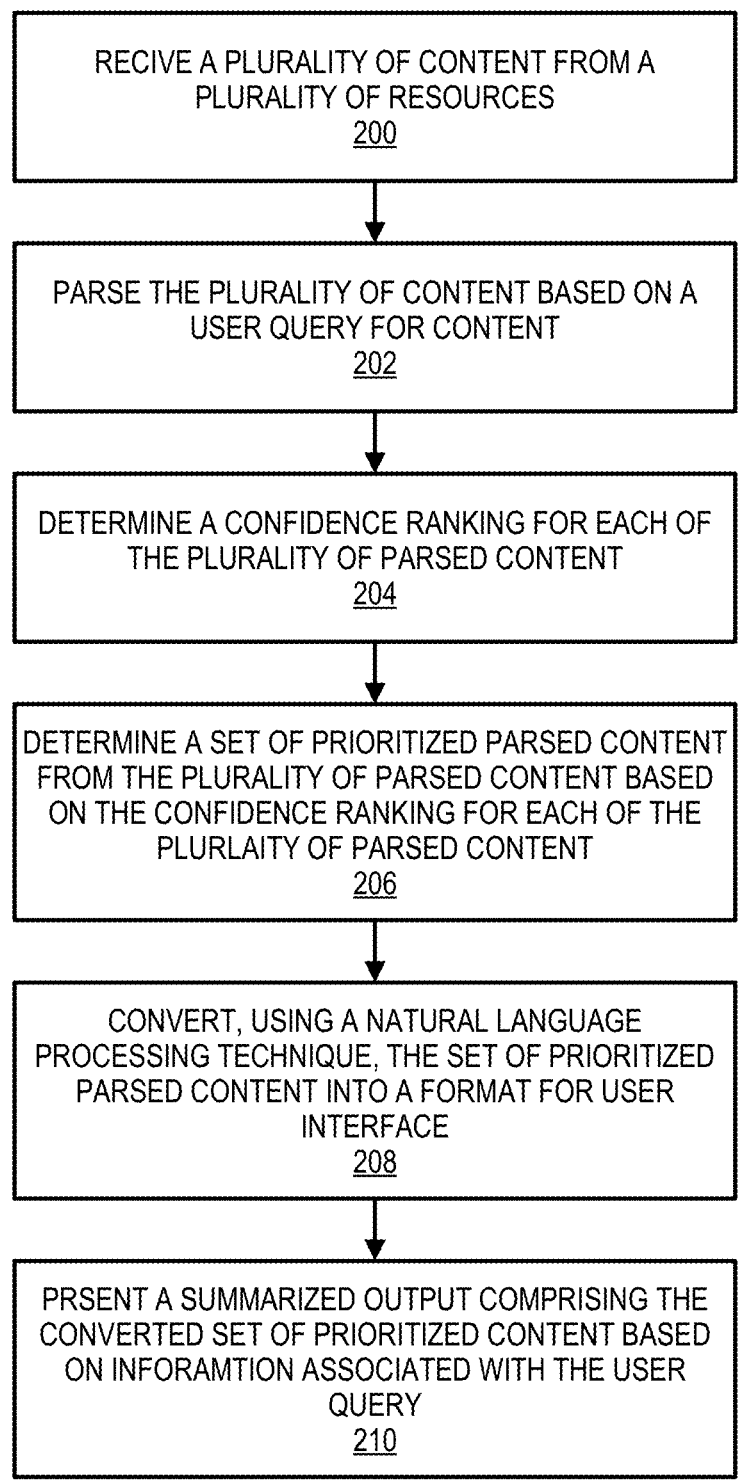
FIG. 2 is a flowchart of an example method for presenting a summarized output based on information associated with a user query in accordance with embodiments of the present disclosure.

In accordance with embodiments of the present disclosure, FIG. 2 illustrates a flowchart of an example method for presenting a summarized output based on information associated with a user query in accordance with embodiments of the present disclosure. The method of FIG. 2 is described by examples as being implemented by the system of FIG. 1, although it should be understood the method may alternatively be implemented by any suitable system. Referring to FIG. 2, the method includes receiving 200 a plurality of content from a plurality of resources. For example, the communications module 102 may be configured to receive a plurality of content from content repositories 110 as shown in FIG. 1. In accordance with embodiments, the content repositories 110 may include repositories of text-based content, multimedia content, audio content, or any other suitable type of content consumable by a user of computing device 100 or other computing devices.

The method of FIG. 2 also includes parsing 202 the plurality of content based on a user query for content. For example, the analytics engine 104 shown in FIG. 1 may be configured to parse the content based on a user query for content from computing device 100 as shown in FIG. 1. In accordance with embodiments, the analytics engine 104 may be configured to parse the content based on one or more of a user profile, an administrative rule, historical data of a user associated with the user query, and the like. For example, the analytics engine 104 may be configured to obtain a user profile associated with the user query from a user profile database 112 shown in FIG. 1. In accordance with embodiments, the user profile may indicate a skill level of a user associated with the user query. The skill level may identify the skill level of the user as one of, but not limited to, a novice, a layman, a scientist, or an expert in relation to a subject matter of the user query. For example, if the user query includes a request for content related to a subject of car repair, the user profile may indicate a skill level of the user in relation to the subject of car repair as a layman. It should be understood that any terms known to indicate skill level in a subject matter may be used in accordance with embodiments of the present disclosure and are not limited to the examples provided herein above.

In another example, the analytics engine 104 may be configured to obtain an administrative rule associated with the user query from an administrative database 114 also shown in FIG. 1. In accordance with embodiments, the administrative rule may include one or more of a system level criteria, a preference setting, or the like associated with a user associated with the user query. For example, the system level criteria may include system level criteria associated with computing device 100. In this example, in the instance computing device 100 is a mobile device, a system level criteria may include, for example, the type of content suitable for display on the mobile device. It should be understood that any terms known to indicate system level criteria of computing devices may be used in accordance with embodiments of the present disclosure and are not limited to the example provided herein above.

The preference setting associated with a user associated with the user query may include, for example, a preference setting indicating a preference of content type associated with the user query. For example, a preference setting associated with a user associated with the user query may include a preference for academic content. In another example, a preference setting associated with a user associated with the user query may include a preference for a particular resource type, such as, but not limited to, scholarly article databases. It should be understood that any terms known for indicating a preference setting associated with a user may be used in accordance with embodiments of the present disclosure and are not limited to the examples provided herein above.

In a further example, the analytics engine 104 may also be configured to obtain historical data of a user associated with the user query from a historical database 116 also shown in FIG. 1. In accordance with embodiments, the historical data may include one or more of a browsing history, electronic mail messages, prior search history results, and the like associated with a user associated with the user query. For example, the browsing history may include a list of websites visited by the user relating to a subject matter associated with the user query for content. In another example, the electronic mail messages may include electronic mail messages associated with a subject matter associated with the user query for content. In a further example, the prior search history results may include search history results of prior searches associated with a subject matter associated with the user query for content.

Figure 3:
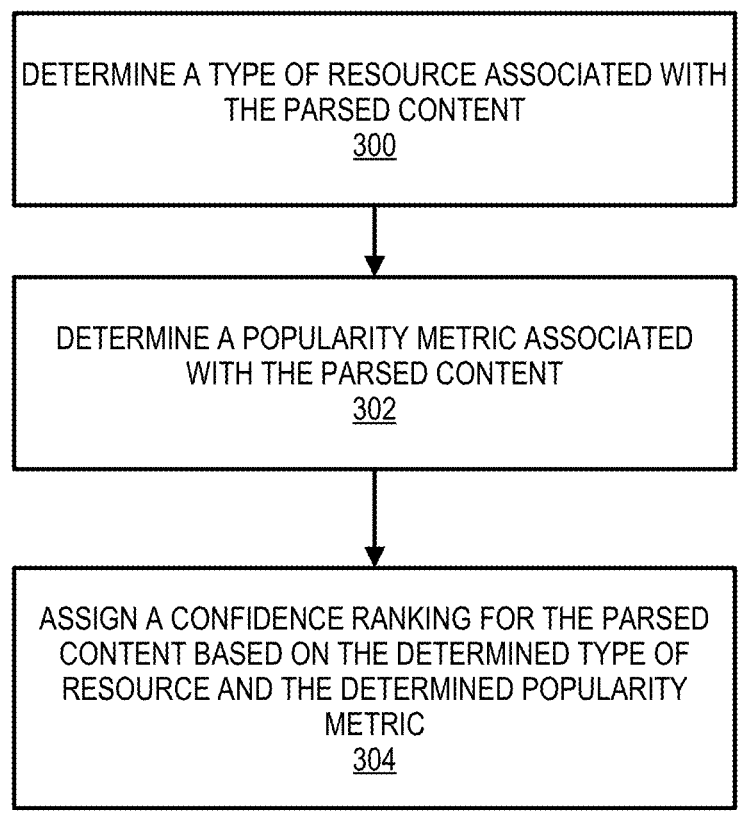
FIG. 3 is a flowchart of an example method of assigning a confidence ranking for the parsed content based on a determined type of resource and a determined popularity metric.

Returning to FIG. 2, the method also includes determining 204 a confidence ranking for each of the plurality of parsed content. For example, the AI engine 106 of FIG. 1 may be configured to determine the confidence ranking for each of the plurality of parsed content from analytics engine 104. In accordance with embodiments, as shown in FIG. 3, the step of determining 204 a confidence ranking for each of the plurality of parsed content may include determining 300 a type of resource associated with the parsed content. The determined type of resource may include one or more of an Internet resource type, technical document type, discussion forum type, social media type, a multimedia type, and the like. Continuing the above example in regards to a user query including a request for content related to a subject of car repair, the AI engine 106 may determine a type of resource associated a parsed content relating to the subject of car repair may include an Internet resource type, such as, but not limited to, an online instructional video. It should be understood that any terms known for identifying a type of resource may be used in accordance with embodiments of the present disclosure and are not limited to the examples provided herein above.

Returning to FIG. 3, the method of determining 204 a confidence ranking for each of the parsed content may include determining 302 a popularity metric associated with the parsed content. In accordance with embodiments, the popularity metric may include a number of click-through(s) associated with the parsed content. Continuing the above example in regards to a user query including a request for content related to a subject of car repair, the AI engine 106 may determine a link directing a user to the parsed content including the online instructional video has been clicked-through by many other users with a similar search query. In accordance with embodiments, the popularity metric may include a number of recommendations associated with the parsed content. In the same example provided above, the AI engine 106 may determine the parsed content including the online instructional video has been recommended by many other users who have viewed the online instructional video. The popularity metric may also include, in some embodiments, a number of downloads associated with the parsed content. In the same example above, the AI engine 106 may determine the parsed content including the online instructional video may have been downloaded by many other users. In accordance with embodiments, the popularity metric may include a number of shares associated with the parsed content. In the same example above, the AI engine 106 may determine the parsed content including the online instructional video may have been shared by many other users in a specific or variety of social media networks.

The method of determining 204 a confidence ranking for each of the plurality of parsed content may include, as illustrated in FIG. 3, assigning 304 the confidence ranking for the parsed content based on the determined type of resource and the determined popularity metric. Continuing the above example in regards to a user query including a request for content related to a subject of car repair, the AI engine 106 may assign the confidence ranking for the parsed content including an online instructional video based on the determination the parsed content included an Internet resource type and the determined number of shares associated with the parsed content.

Figure 4:
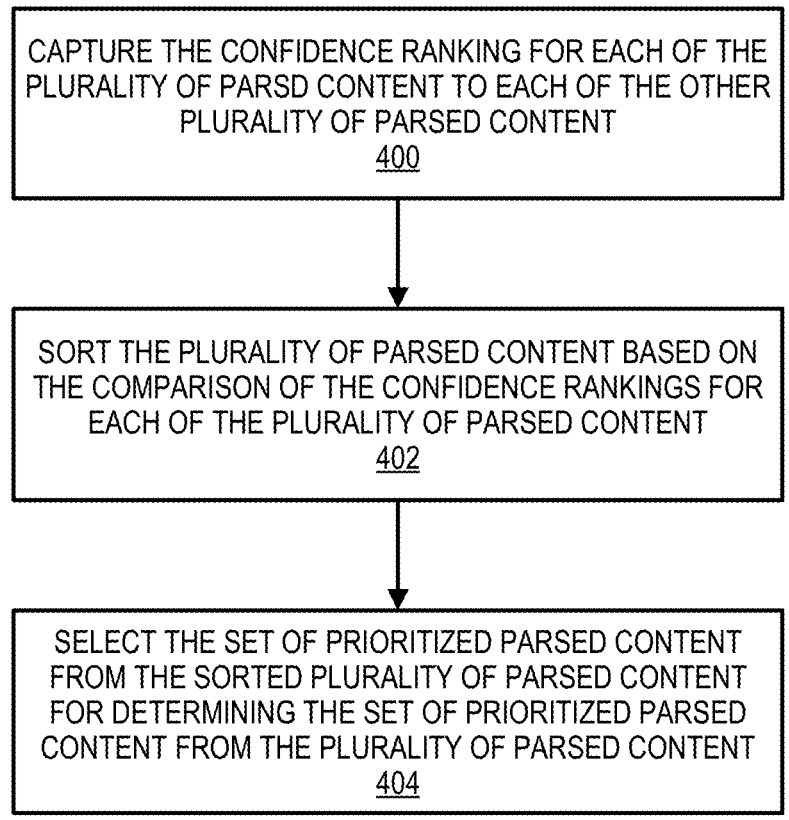
FIG. 4 is a flowchart of an example method of selecting a set of prioritized content from the sorted plurality of parsed content, for determining the set of prioritized parsed content from the plurality of parsed content in accordance with embodiments of the present disclosure.

Returning now to FIG. 2, the method also includes determining 206 a set of prioritized parsed content from the parsed content based on the confidence ranking for each of the plurality of parsed content. In accordance with embodiments, as shown in FIG. 4, the step of determining 206 may include comparing 400 the confidence ranking for each of the plurality of parsed content to each of the other plurality of parsed content. For example, the AI engine 106 may determine the set of prioritized parsed content by comparing the confidence ranking for each of the plurality of parsed content to each of the other plurality of parsed content. FIG. 4 also illustrates the step of determining 206 may also include sorting 402 the parsed content based on the comparison of the confidence rankings for each of the plurality of parsed content. In accordance with embodiments, the parsed content may be sorted from one or more of the content having a high confidence ranking to one or more of the parsed content having a low confidence ranking Continuing the above example in regards to a user query including a request for content related to a subject of car repair, the AI engine 106 may have assigned the parsed content including an online instructional video with a high number of recommendations a high confidence ranking In the same example, the AI engine 106 may have assigned another parsed content of the plurality of parsed content including an online instructional video with a low number of recommendations with a low confidence ranking Thus, in this example, the AI engine 106 may be configured to sort the parsed content including the online instructional video with the high number of recommendations prior to the another parsed content including also including an online instructional video with a low number of recommendations.

FIG. 4 also illustrates the step of determining 206 may include selecting 404 the set of prioritized parsed content from the sorted plurality of parsed content, for determining the set of prioritized parsed content from the plurality of parsed content. In accordance with embodiments, the set of prioritized parsed content may be selected from the parsed content having a high confidence ranking Continuing the above example in regards to a user query including a request for content related to a subject of car repair, the AI engine 106 may select a set of prioritized parsed content from the sorted, parsed content related to the subject of car repair. In this example, AI engine 106 may select the prioritized parsed content from the parsed content related to the subject of car repair having a high confidence ranking Returning to FIG. 2, the method also includes converting 208, using a natural language technique, the set of prioritized parsed content into a format for user interface. For example, the natural language engine 108 may receive the prioritized parsed content form the AI engine 106 to convert the set of prioritized content into a format for user interface. In accordance with embodiments, the natural language technique may include comparing the set of prioritized parsed content to a writing style associated with the user to determine the format for user interface. For example, natural language engine 108 may compare the set of prioritized content to a writing style associated with the user to determine the format for user interface for display to the user associated with the user query received from computing device 100. The natural language engine 108 may subsequently convert the set of prioritized parsed content into the determined format for user interface.

Figure 5:
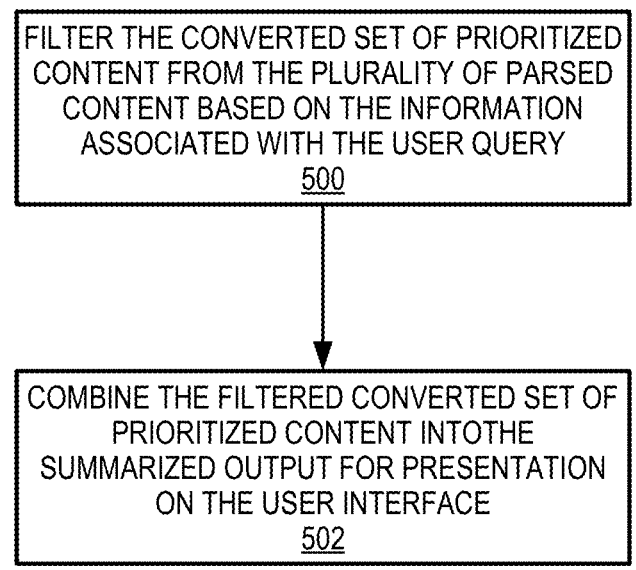
FIG. 5 is a flowchart of an example method of combining a filtered converted set of prioritized content into the summarized output for presentation on a user interface in accordance with embodiments of the present disclosure.

FIG. 5 illustrates the method may include filtering 500 the converted set of prioritized content from the parsed content based on the information associated with the user query. For example, the natural language engine 208 may filter the converted set of prioritized content from the parsed content based on the information associated with the user query received from computing device 100. In some embodiments, the information associated with the user query include one or more of a user profile, administrative rule, historical data, and the like of a user associated with the user query. In some embodiments, the information associated with the user query one or more of a skill level of a user associated with the user query and a learning style of a user associated with the user query. As stated previously above, the skill level may identify the skill level of the user as one of, but not limited to, a novice, a layman, a scientist, or an expert in relation to a subject matter of the user query. Continuing the above example in regards to a user query including a request for content related to a subject of car repair, the information associated with the user query received from computing device 100 may identify the skill level of a user associated with the user query related to the subject of car repair as a layman. It should be understood that any terms known to indicate skill level in a subject matter may be used in accordance with embodiments of the present disclosure and are not limited to the examples provided herein above.

The learning style may identify the learning style of a user associated with the user query as one of, but not limited to, a visual learning style, an auditory learning style, a reading-writing learning style, a tactile learning style, or any combination thereof. Continuing the above example, the information associated with the user query received from computing device 100 may identify the learning style of a user associated with the user query related to the subject of car repair as a combination of a visual learning style and a reading-writing learning style. It should be understood that any terms known to indicate a learning style may be used in accordance with embodiments of the present disclosure and are not limited to the examples provided herein above.

Thus, in the above example, the natural language engine 208 may filter the converted set of prioritized content from the parsed content of most interested to a layman in the subject matter of car repair with a preference for a combination of visual and reading-writing learning styles.

Figure 6:
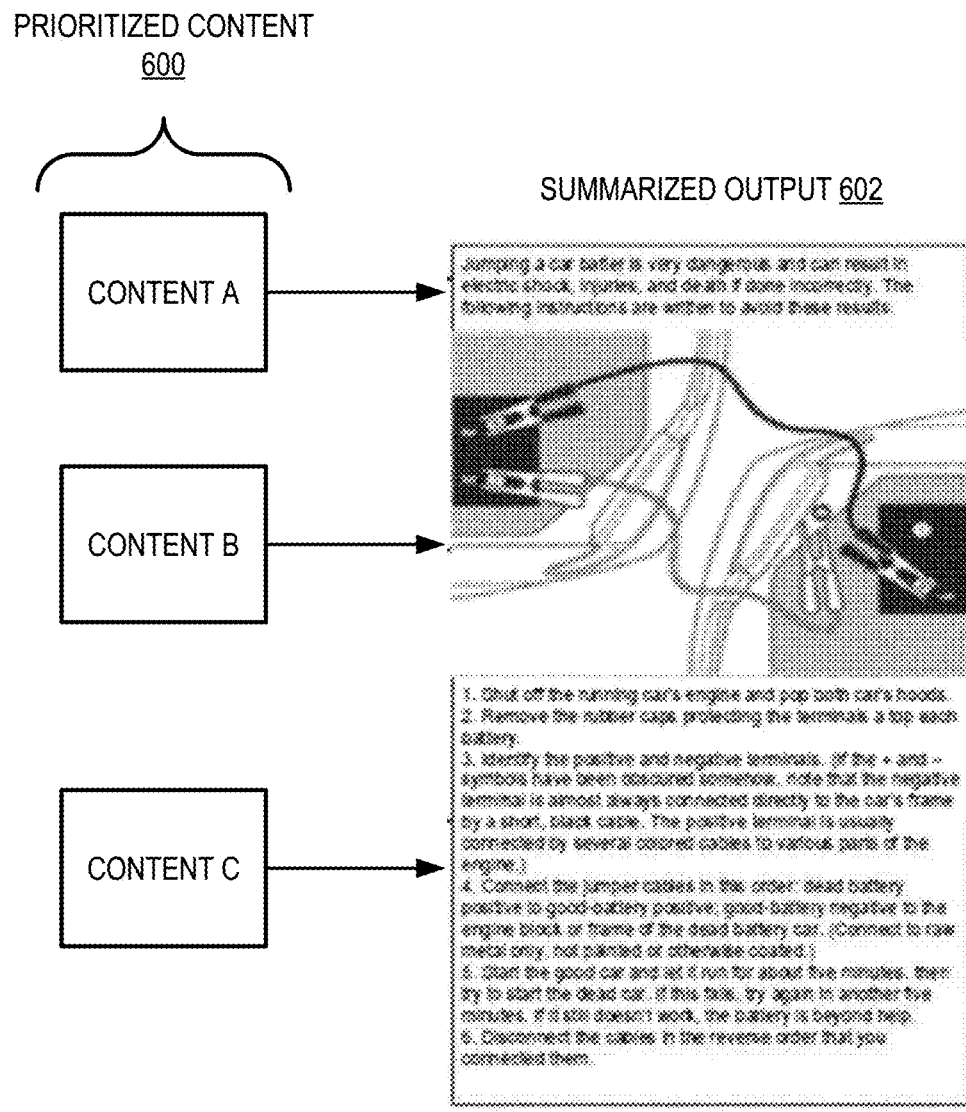
FIG. 6 is an example of a summarized output in accordance with embodiments of the present disclosure.

Returning to FIG. 5, the method may also include combining 502 the filtered converted set of prioritized content into the summarized output for presentation on the user interface. FIG. 6 provides an example of the natural language engine 208 combining the filtered converted set of prioritized content 600 in the summarized output 602 for presentation on the user interface. As shown in FIG. 6, the example summarized output 602 includes filtered converted prioritized content A and content C including text-based information related to the subject of car repair. The example summarized output 602 also includes a filtered converted prioritized content B including a picture demonstrating how to connect jumper cables property between two vehicle batteries. Thus, the example summarized output 602 provides a summarized custom output in response to a user query related to the subject of car repair. The example summarized output 602 demonstrated in FIG. 6 also addresses the layman skill level of the user associated with the query and the learning style preferences of the user associated with the query.

Returning to FIG. 2, the method further includes presenting 210 a summarized output including the converted set of prioritized content based on information associated with the user query. For example, the natural language engine 108 may present the summarized output 602 including the converted set of prioritized content 600 based on information associated with the user query to the computing device 100. In accordance with embodiments, the natural language engine 108 presents the summarized output 602 via a user interface configured to present the summarized output 602 to computing device 100. In some embodiments, the natural language engine 108 may communicate the summarized output 602 to the computing device 100 for presentation on a user interface of computing device 100 configured to present the summarized output 602 on computing device 100.

Returning to FIG. 1, the system may also include a learning engine 118 configured to communicate the summarized output to the administrative database historical database 114 and/or the historical database 116 for future queries by the user of computing device 100. In accordance with embodiments, the administrative database 114 may be configured to determine a user preference based on the summarized output for future queries by the user of computing device 100. The historical database 114 may also be configured to store the summarized output for the analytics engine 104 to used in future queries from a user associated with computing device 100. For example, historical database 114 may determine the types of resources contained within the summarized output presented to the user in response to the user query. In this example, the historical database 114 may communicate to the analytics engine 104 the type of resources for future user queries associated with subject matter of the stored summarized output.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by using state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method implemented by an information handling system that includes a memory and a processor, the method comprising:
    parsing a plurality of content received from a plurality of resources based on a user query corresponding to a user;
    selecting a set of prioritized content from the plurality of parsed content based on a confidence ranking of each of the plurality of parsed content;
    filtering the set of prioritized content based on a learning style of the user;
    presenting a summarized output comprising the filtered set of prioritized content to the user;
    adjusting the learning style of the user based on the summarized output; and
    using the adjusted learning style during one or more future user queries by the user.

2. The method of claim 1 wherein the learning style is selected from the group consisting of a visual learning style, an auditory learning style, a reading-writing learning style, and a tactile learning style.

3. The method of claim 1 wherein the learning style is a visual learning style, and wherein the filtering further comprises:
    adding one or more visual type content to the filtered set of prioritized content, wherein the one or more visual type content is selected from the group consisting of a video file and an image file.

4. The method of claim 1 wherein the learning style is an auditory learning style, and wherein the filtering further comprises:
    adding one or more audio type content to the filtered set of prioritized content.

5. The method of claim 1 wherein the learning style is a combination of a visual learning style and an auditory learning style, and wherein the filtering further comprises:
    adding multimedia content to the filtered set of content that comprises both a visual type content and an audio type content.

6. The method of claim 1 further comprising:
    for each of a selected one of the plurality of parsed content:
        determining a resource type of a selected one of the plurality of resources that provided the selected parsed content;
        determining a popularity metric associated with the selected parsed content; and
        assigning the confidence ranking to the selected parsed content based on the determined resource type and the determined popularity metric.

7. An information handling system comprising:
    one or more processors;
    a memory coupled to at least one of the processors;
    a set of computer program instructions stored in the memory and executed by at least one of the processors in order to perform actions of:
    parsing a plurality of content received from a plurality of resources based on a user query corresponding to a user;
    selecting a set of prioritized content from the plurality of parsed content based on a confidence ranking of each of the plurality of parsed content;
    filtering the set of prioritized content based on a learning style of the user;
    presenting a summarized output comprising the filtered set of prioritized content to the user;
    adjusting the learning style of the user based on the summarized output; and
    using the adjusted learning style during one or more future user queries by the user.

8. The information handling system of claim 7 wherein the learning style is selected from the group consisting of a visual learning style, an auditory learning style, a reading-writing learning style, and a tactile learning style.

9. The information handling system of claim 7 wherein the learning style is a visual learning style and wherein, during the filtering, the processors perform additional actions comprising:
    adding one or more visual type content to the filtered set of prioritized content, wherein the one or more visual type content is selected from the group consisting of a video file and an image file.

10. The information handling system of claim 7 wherein the learning style is an auditory learning style and wherein, during the filtering, the processors perform additional actions comprising:
    adding one or more audio type content to the filtered set of prioritized content.

11. The information handling system of claim 7 wherein the learning style is a combination of a visual learning style and an auditory learning style and wherein, during the filtering, the processors perform additional actions comprising:
    adding multimedia content to the filtered set of content that comprises both a visual type content and an audio type content.

12. The information handling system of claim 7 wherein the processors perform additional actions comprising:
    for each of a selected one of the plurality of parsed content:
        determining a resource type of a selected one of the plurality of resources that provided the selected parsed content;
        determining a popularity metric associated with the selected parsed content; and assigning the confidence ranking to the selected parsed content based on the determined resource type and the determined popularity metric.

13. A computer program product stored in a computer readable storage medium, comprising computer program code that, when executed by an information handling system, causes the information handling system to perform actions comprising:

parsing a plurality of content received from a plurality of resources based on a user query corresponding to a user;

selecting a set of prioritized content from the plurality of parsed content based on a confidence ranking of each of the plurality of parsed content;

filtering the set of prioritized content based on a learning style of the user;

presenting a summarized output comprising the filtered set of prioritized content to the user;

adjusting the learning style of the user based on the summarized output; and using the adjusted learning style during one or more future user queries by the user.

14. The computer program product of claim 13 wherein the learning style is selected from the group consisting of a visual learning style, an auditory learning style, a reading-writing learning style, and a tactile learning style.

15. The computer program product of claim 13 wherein the learning style is a visual learning style and wherein, during the filtering, the processors perform additional actions comprising:

adding one or more visual type content to the filtered set of prioritized content, wherein the one or more visual type content is selected from the group consisting of a video file and an image file.

16. The computer program product of claim 13 wherein the learning style is an auditory learning style and wherein, during the filtering, the processors perform additional actions comprising:

adding one or more audio type content to the filtered set of prioritized content.

17. The computer program product of claim 13 wherein the learning style is a combination of a visual learning style and an auditory learning style and wherein, during the filtering, the processors perform additional actions comprising:

adding multimedia content to the filtered set of content that comprises both a visual type content and an audio type content.

* * * * *